US012754607B2

(12) United States Patent
Wang et al.

(10) Patent No.: US 12,754,607 B2
(45) Date of Patent: Oct. 6, 2026

(54) HEAD-MOUNTED DEVICE INPUT

(71) Applicant: Apple Inc., Cupertino, CA (US)

(72) Inventors: Paul X Wang, Cupertino, CA (US); Ashwin Kumar Asoka Kumar Shenoi, San Jose, CA (US); Shuxin Yu, San Francisco, CA (US); Benjamin R Blachnitzky, San Francisco, CA (US); Jie Gu, Palo Alto, CA (US); Fletcher R Rothkopf, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/614,219

(22) Filed: Mar. 22, 2024

(65) Prior Publication Data

US 2025/0004545 A1 Jan. 2, 2025

Related U.S. Application Data

(60) Provisional application No. 63/511,518, filed on Jun. 30, 2023.

(51) Int. Cl.

| | |
|---|---|
| ***G06F 3/01*** | (2006.01) |
| ***G06F 3/04815*** | (2022.01) |
| ***G06F 3/0487*** | (2013.01) |

(52) U.S. Cl.

CPC .............. *G06F 3/013* (2013.01); *G06F 3/017* (2013.01); *G06F 3/04815* (2013.01); *G06F 3/0487* (2013.01)

(58) Field of Classification Search

CPC .......... G06F 3/011; G06F 3/012; G06F 3/013; G06F 3/014; G06F 3/017; G06F 3/0487

See application file for complete search history.

(56) References Cited

U.S. PATENT DOCUMENTS

| | | | | |
|---|---|---|---|---|
| 11,112,856 | B2 | 9/2021 | Rouvinez et al. | |
| 11,327,651 | B2 * | 5/2022 | Richardson | G06F 3/04883 |
| 11,379,033 | B2 | 7/2022 | O'Hern et al. | |
| 11,610,371 | B2 | 3/2023 | Powderly et al. | |
| 11,800,084 | B2 * | 10/2023 | Gur | G02B 27/0093 |
| 12,019,808 | B2 * | 6/2024 | Winters, IV | G06V 40/20 |
| 12,099,653 | B2 * | 9/2024 | Chawda | G06F 3/011 |
| 12,118,141 | B2 * | 10/2024 | Wang | G06F 3/013 |

(Continued)

FOREIGN PATENT DOCUMENTS

WO 2023023299 A1 2/2023

*Primary Examiner* — Patrick F Marinelli

(74) *Attorney, Agent, or Firm* — Treyz Law Group, P.C.; David K. Cole

(57) ABSTRACT

A head-mounted device may have a head-mounted support structure, a gaze tracker in the head-mounted support structure, and one or more displays in the head-mounted support structure. For example, two displays may display images to two eye boxes. The display may display a virtual keyboard and may display a text input in response to a gaze location that is determined by the gaze tracker. The gaze tracker may additionally determine a gaze swipe input, or a camera in the support structure may determine a hand swipe input, and the swipe input may be used with the gaze location to determine the text input. In particular, the swipe input may create a swipe input curve that is fit to the text input to determine the text input. A user's hand may be used as a secondary input to indicate the start or end of a text input.

11 Claims, 11 Drawing Sheets

(56) References Cited

U.S. PATENT DOCUMENTS

| | | | | |
|---|---|---|---|---|
| 12,118,200 | B1* | 10/2024 | Shutzberg | G06F 3/0482 |
| 2013/0127980 | A1* | 5/2013 | Haddick | G06F 3/013<br>348/14.08 |
| 2015/0113465 | A1 | 4/2015 | Fox et al. | |
| 2017/0017080 | A1* | 1/2017 | Onwuta | G06F 3/013 |
| 2017/0090747 | A1* | 3/2017 | Dash | G06F 1/163 |
| 2017/0322623 | A1* | 11/2017 | McKenzie | G06F 3/04886 |
| 2019/0346936 | A1* | 11/2019 | Dash | G06F 3/0304 |
| 2021/0097775 | A1* | 4/2021 | Zurmoehle | G06F 1/1694 |
| 2021/0247900 | A1* | 8/2021 | Richardson | G06F 3/0426 |
| 2022/0101593 | A1* | 3/2022 | Rockel | A63F 13/213 |
| 2022/0121344 | A1* | 4/2022 | Pastrana Vicente | G06F 3/013 |
| 2023/0214015 | A1 | 7/2023 | Stolzenberg et al. | |
| 2023/0244316 | A1* | 8/2023 | Schwarz | G06N 3/08<br>345/156 |
| 2023/0314820 | A1* | 10/2023 | Franklin | G02B 27/0176<br>345/8 |
| 2023/0377223 | A1* | 11/2023 | Moll | G02B 27/017 |
| 2024/0085985 | A1* | 3/2024 | Winters, IV | G06F 3/015 |
| 2024/0103613 | A1* | 3/2024 | Chawda | G06F 3/0304 |
| 2024/0134505 | A1* | 4/2024 | Zhou | G06F 3/0236 |
| 2024/0134516 | A1* | 4/2024 | Guo | G06T 19/00 |
| 2024/0231607 | A1* | 7/2024 | Pedersen | G06F 3/0236 |
| 2024/0298946 | A1* | 9/2024 | Wang | A61B 5/163 |
| 2024/0310902 | A1* | 9/2024 | Wang | G06F 3/013 |
| 2024/0329751 | A1* | 10/2024 | Winters, IV | G06N 5/01 |
| 2025/0265755 | A1* | 8/2025 | Moll | G02B 27/017 |

* cited by examiner

HEAD-MOUNTED DEVICE INPUT

This application claims the benefit of U.S. provisional patent application No. 63/511,518, filed Jun. 30, 2023, which is hereby incorporated by reference herein in its entirety.

FIELD

This relates generally to electronic devices, and, more particularly, to wearable electronic devices such as head-mounted devices.

BACKGROUND

Electronic devices such as head-mounted devices may have displays for displaying images. The displays may be housed in optical modules. A user may view the displayed images while a head-mounted device is being worn on the user's head.

SUMMARY

A head-mounted device may have left-eye and right-eye optical modules that move with respect to each other. Each optical module may have a display that creates an image and a corresponding lens that provides the image to an associated eye box for viewing by a user. The optical modules may each include a lens barrel in which the display and lens of that optical module are mounted. The optical modules may also each include a head-mounted device optical module gaze tracking system.

The gaze tracking system in each optical module may be used to create glints on a user's eye, such as by using a light emitter. One or more cameras in the optical module may monitor the glints to track the gaze of the user. The cameras may also measure the shape of a user's pupil while the eye box in which the pupil is located is illuminated by the gaze tracking system. In some configurations, illumination may be provided from the gaze tracking system while a camera captures biometric identification information such as iris information.

The gaze tracking system of each optical module may have light sources operating at visible wavelengths, infrared wavelengths, and/or other wavelengths. The light sources may be, for example, near infrared light-emitting diodes.

The displays may display a virtual keyboard and may display a text input in response to a gaze location that is determined by the gaze tracking system. The gaze tracking system may additionally determine a gaze swipe input, which may be used with the gaze location to determine the text input. Alternatively, a camera in the head-mounted device may determine a hand swipe input, and the which may be used with the gaze location to determine the text input. In particular, the swipe input may create a swipe input curve that is fit to the text input to determine the text input.

A user's hand may be used as a secondary input to indicate the start or end of a text input. For example, the user may move their hand or pinch their fingers to indicate the beginning or end of swipe tracking. In other words, gaze locations and/or hand locations between the secondary inputs (e.g., between first and second movements of the user's hand) may be used to form the swipe input curve. The user's other hand may be used as an additional input, and may be used to signal a pause in swipe tracking, to delete a portion of the text input, to select an autofill recommendation, or otherwise interact with the text input

DETAILED DESCRIPTION

An electronic device such as a head-mounted device may have a front face that faces away from a user's head and may have an opposing rear face that faces the user's head. Optical modules on the rear face may include displays that may be used to provide images to a user's eyes. To monitor the eyes of a user, the electronic device may be provided with eye monitoring components, such as a gaze tracking system (also referred to as a gaze tracker herein). The gaze tracker, for example, cameras. An illumination system in each optical module may provide light to the user's eyes. In particular, the light may illuminate the user's eyes so that the cameras can capture images of the user's eyes. In an illustrative configuration, the illumination system of each optical module includes multiple discrete light sources such as light-emitting diodes. The light-emitting diodes may create glints on the user's eyes and can illuminate the user's pupils and irises. The cameras can then monitor the positions of the glints and/or the shapes of the user's pupils to determine the direction of gaze of the user. The cameras can also capture images of the user's irises (e.g., for biometric authentication).

In some embodiments, it may be desirable to use the gaze tracking system for input to the electronic device. In other words, the gaze tracker may determine a gaze swipe input. In particular, a keyboard may be displayed using the displays in the optical modules. The user may then select text input via gaze tracking. For example, the user's gaze may be tracked to form a gaze swipe tracking curve, and a gaze-based swipe typing algorithm may be used to determine a text input (e.g., words, emoji, etc.) based on the gaze swipe tracking curve. Additionally, cameras or other sensors, such as cameras at the front face of the device, may gather input from the user to determine when to track the user's gaze for input. In this way, gaze may be used for text input in a head-mounted device.

Alternatively or additionally, cameras in the head-mounted device may track a user's hand to perform hand swipe tracking. In particular, the hand may be tracked to form a hand swipe tracking curve, and a hand-based swipe typing algorithm may be used to determine the text input.

Figure 1:
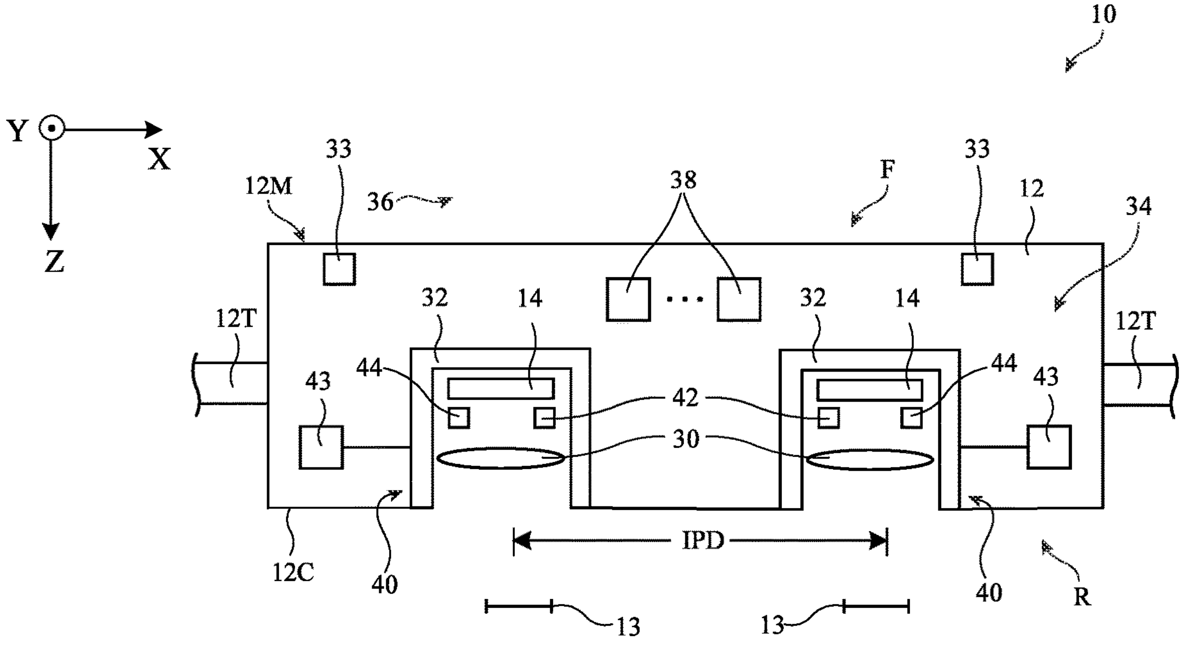
FIG. 1 is a top view of an illustrative head-mounted device in accordance with some embodiments.

A top view of an illustrative head-mounted device that may use gaze or hand tracking for text input is shown in FIG. 1. As shown in FIG. 1, head-mounted devices such as electronic device 10 may have head-mounted support structures such as housing 12. Housing 12 may include portions (e.g., support structures 12T) to allow device 10 to be worn on a user's head. Support structures 12T may be formed from fabric, polymer, metal, and/or other material. Support structures 12T may form a strap or other head-mounted support structures to help support device 10 on a user's head. A main support structure (e.g., main housing portion 12M) of housing 12 may support electronic components such as displays 14. Main housing portion 12M may include housing structures formed from metal, polymer, glass, ceramic, and/or other material. For example, housing portion 12M may have housing walls on front face F and housing walls on adjacent top, bottom, left, and right side faces that are formed from rigid polymer or other rigid support structures and these rigid walls may optionally be covered with electrical components, fabric, leather, or other soft materials, etc. The walls of housing portion 12M may enclose internal components 38 in interior region 34 of device 10 and may separate interior region 34 from the environment surrounding device 10 (exterior region 36). Internal components 38 may include integrated circuits, actuators, batteries, sensors, and/or other circuits and structures for device 10. Housing 12 may be configured to be worn on a head of a user and may form glasses, a hat, a helmet, goggles, and/or another head-mounted device. Configurations in which housing 12 forms goggles may sometimes be described herein as an example.

Front face F of housing 12 may face outwardly away from a user's head and face. Opposing rear face R of housing 12 may face the user. Portions of housing 12 (e.g., portions of main housing portion 12M) on rear face R may form a cover such as cover 12C (sometimes referred to as a curtain). The presence of cover 12C on rear face R may help hide internal housing structures, internal components 38, and other structures in interior region 34 from view by a user.

Device 10 may have left and right optical modules 40. Each optical module may include a respective display 14, lens 30, and support structure 32. Support structures 32, which may sometimes be referred to as lens barrels or optical module support structures, may include hollow cylindrical structures with open ends or other supporting structures to house displays 14 and lenses 30. Support structures 32 may, for example, include a left lens barrel that supports a left display 14 and left lens 30 and a right lens barrel that supports a right display 14 and right lens 30.

Displays 14 may include arrays of pixels or other display devices to produce images. Displays 14 may, for example, include organic light-emitting diode pixels formed on substrates with thin-film circuitry and/or formed on semiconductor substrates, pixels formed from crystalline semiconductor dies, liquid crystal display pixels, scanning display devices, and/or other display devices for producing images.

Lenses 30 may each include one or more lens elements for providing image light from displays 14 to respective eyes boxes 13. Lenses 30 may be implemented using refractive glass lens elements, using mirror lens structures (catadioptric lenses), using Fresnel lenses, using holographic lenses, and/or other lens systems.

When a user's eyes are located in eye boxes 13, displays (display panels) 14 operate together to form a display for device 10 (e.g., the images provided by respective left and right optical modules 40 may be viewed by the user's eyes in eye boxes 13 so that a stereoscopic image is created for the user). In other words, the left image from the left optical module fuses with the right image from a right optical module while the display is viewed by the user. The images provided to eye boxes 13 may provide the user with a virtual reality environment, an augmented reality environment, and/or a mixed reality environment (e.g., different environments may be used to display different content to the user at different times). Although two separate displays 14 are shown in FIG. 1, with one display displaying an image for each of eye boxes 13, this is merely illustrative. A single display 14 may display images to both eye boxes 13, if desired.

It may be desirable to monitor the user's eyes while the user's eyes are located in eye boxes 13. For example, it may be desirable to use a camera to capture images of the user's irises (or other portions of the user's eyes) for user authentication. It may also be desirable to monitor the direction (e.g., the location) of the user's gaze. Gaze tracking information may be used as a form of user input and/or may be used to determine where, within an image, image content resolution should be locally enhanced in a foveated imaging system. To ensure that device 10 can capture satisfactory eye images while a user's eyes are located in eye boxes 13, each optical module 40 may be provided with a gaze tracking system (also referred to as a gaze tracker herein) that includes a camera such as camera 42 and one or more light sources (e.g., light emitters) such as light-emitting diodes 44 (e.g., lasers, lamps, etc.). Multiple cameras 42 may be provided in each optical module 40, if desired.

Cameras 42 and light-emitting diodes 44 may operate at any suitable wavelengths (visible, infrared, and/or ultraviolet). With an illustrative configuration, which may sometimes be described herein as an example, diodes 44 emit infrared light or near infrared light that is invisible (or nearly invisible) to the user, such as near infrared light at 950 nm or 840 nm. This allows eye monitoring operations to be performed continuously without interfering with the user's ability to view images on displays 14.

Not all users have the same interpupillary distance IPD. To provide device 10 with the ability to adjust the interpupillary spacing between modules 40 along lateral dimension X and thereby adjust the spacing IPD between eye boxes 13 to accommodate different user interpupillary distances, device 10 may be provided with actuators 43. Actuators 43 can be manually controlled and/or computer-controlled actuators (e.g., computer-controlled motors) for moving support structures 32 relative to each other. Information on the locations of the user's eyes may be gathered using, for example, cameras 42. The locations of eye boxes 13 can then be adjusted accordingly.

Device 10 may also include sensors on front face F. In the illustrative example of FIG. 1, device 10 includes sensors 33 at front face F. Sensors 33 may be, for example, cameras, light detection and ranging (LIDAR) sensors, radar sensors, ambient light sensors, and/or other suitable sensors. In some illustrative configurations, device 10 may include multiple cameras at front face F to image scenes and objects at the exterior of device 10. These scenes and images may be displayed on displays 14 for a user (e.g., as pass-through images), and virtual content may be overlaid onto the scenes and images (e.g., as a mixed reality environment). However, this arrangement is merely illustrative. In general, device 10 may include any number of suitable sensors 33 and/or other components at front face F.

Figure 2:
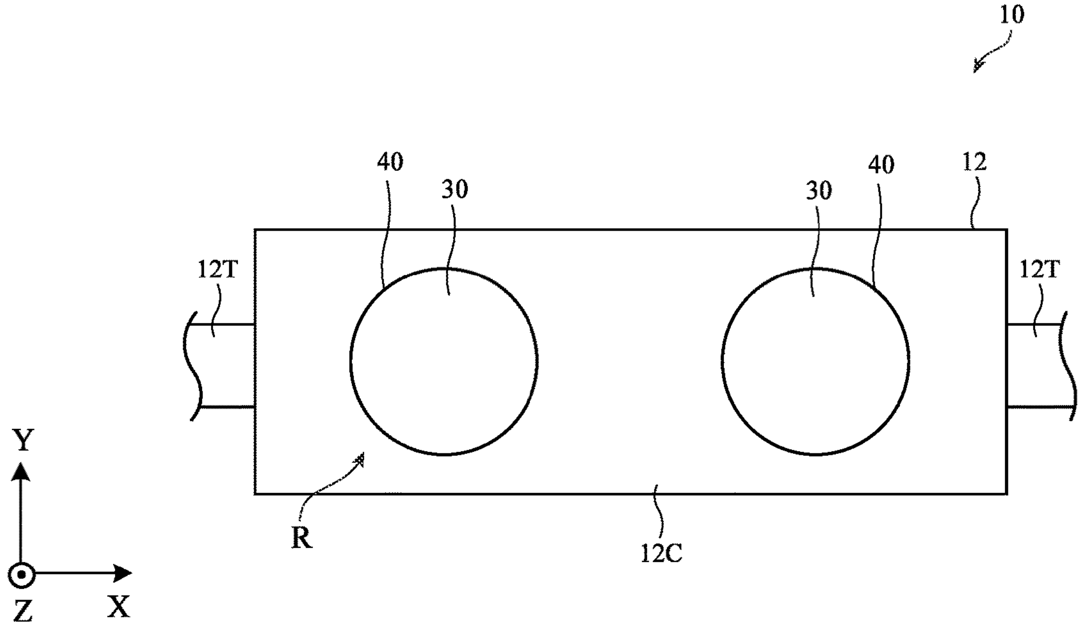
FIG. 2 is a rear view of an illustrative head-mounted device in accordance with some embodiments.

As shown in FIG. 2, cover 12C may cover rear face R while leaving lenses 30 of optical modules 40 uncovered (e.g., cover 12C may have openings that are aligned with and receive modules 40). As modules 40 are moved relative to each other along dimension X to accommodate different interpupillary distances for different users, modules 40 move relative to fixed housing structures such as the walls of main portion 12M and move relative to each other.

Figure 3:
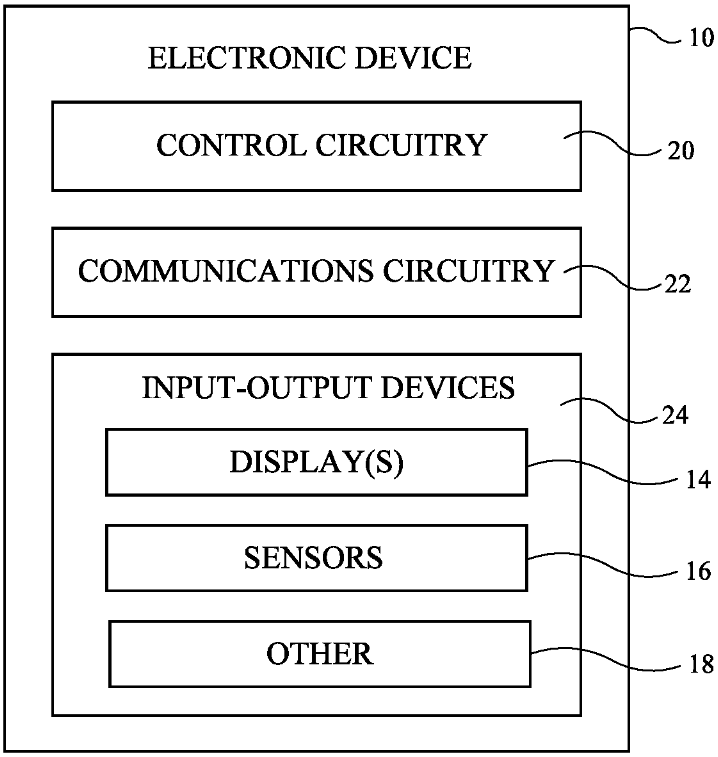
FIG. 3 is a schematic diagram of an illustrative head-mounted device in accordance with some embodiments.

A schematic diagram of an illustrative electronic device such as a head-mounted device or other wearable device is shown in FIG. 3. Device 10 of FIG. 3 may be operated as a stand-alone device and/or the resources of device 10 may be used to communicate with external electronic equipment. As an example, communications circuitry in device 10 may be used to transmit input information, sensor information, and/or other information to external electronic devices (e.g., wirelessly or via wired connections). Each of these external devices may include components of the type shown by device 10 of FIG. 3.

As shown in FIG. 3, a head-mounted device such as device 10 may include control circuitry 20. Control circuitry 20 may include storage and processing circuitry for supporting the operation of device 10. The storage and processing circuitry may include storage such as nonvolatile memory (e.g., flash memory or other electrically-programmable-read-only memory configured to form a solid-state drive), volatile memory (e.g., static or dynamic random-access-memory), etc. Processing circuitry in control circuitry 20 may be used to gather input from sensors and other input devices and may be used to control output devices. The processing circuitry may be based on one or more microprocessors, microcontrollers, digital signal processors, baseband processors and other wireless communications circuits, power management units, audio chips, application specific integrated circuits, etc. During operation, control circuitry 20 may use display(s) 14 and other output devices in providing a user with visual output and other output.

To support communications between device 10 and external equipment, control circuitry 20 may communicate using communications circuitry 22. Circuitry 22 may include antennas, radio-frequency transceiver circuitry, and other wireless communications circuitry and/or wired communications circuitry. Circuitry 22, which may sometimes be referred to as control circuitry and/or control and communications circuitry, may support bidirectional wireless communications between device 10 and external equipment (e.g., a companion device such as a computer, cellular telephone, or other electronic device, an accessory such as a point device, computer stylus, or other input device, speakers or other output devices, etc.) over a wireless link. For example, circuitry 22 may include radio-frequency transceiver circuitry such as wireless local area network transceiver circuitry configured to support communications over a wireless local area network link, near-field communications transceiver circuitry configured to support communications over a near-field communications link, cellular telephone transceiver circuitry configured to support communications over a cellular telephone link, or transceiver circuitry configured to support communications over any other suitable wired or wireless communications link. Wireless communications may, for example, be supported over a Bluetooth® link, a WiFi® link, a wireless link operating at a frequency between 10 GHz and 400 GHz, a 60 GHz link, or other millimeter wave link, a cellular telephone link, or other wireless communications link. Device 10 may, if desired, include power circuits for transmitting and/or receiving wired and/or wireless power and may include batteries or other energy storage devices. For example, device 10 may include a coil and rectifier to receive wireless power that is provided to circuitry in device 10.

Device 10 may include input-output devices such as devices 24. Input-output devices 24 may be used in gathering user input, in gathering information on the environment surrounding the user, and/or in providing a user with output. Devices 24 may include one or more displays such as display(s) 14. Display(s) 14 may include one or more display devices such as organic light-emitting diode display panels (panels with organic light-emitting diode pixels formed on polymer substrates or silicon substrates that contain pixel control circuitry), liquid crystal display panels, microelectromechanical systems displays (e.g., two-dimensional mirror arrays or scanning mirror display devices), display panels having pixel arrays formed from crystalline semiconductor light-emitting diode dies (sometimes referred to as microLEDs), and/or other display devices.

Sensors 16 in input-output devices 24 may include force sensors (e.g., strain gauges, capacitive force sensors, resistive force sensors, etc.), audio sensors such as microphones, touch and/or proximity sensors such as capacitive sensors such as a touch sensor that forms a button, trackpad, or other input device), and other sensors. If desired, sensors 16 may include optical sensors such as optical sensors that emit and detect light, ultrasonic sensors, optical touch sensors, optical proximity sensors, and/or other touch sensors and/or proximity sensors, monochromatic and color ambient light sensors, image sensors (e.g., cameras), fingerprint sensors, iris scanning sensors, retinal scanning sensors, and other biometric sensors, temperature sensors, sensors for measuring three-dimensional non-contact gestures ("air gestures"), pressure sensors, sensors for detecting position, orientation, and/or motion (e.g., accelerometers, magnetic sensors such as compass sensors, gyroscopes, and/or inertial measurement units that contain some or all of these sensors), health sensors such as blood oxygen sensors, heart rate sensors, blood flow sensors, and/or other health sensors, radio-frequency sensors, depth sensors (e.g., structured light sensors and/or depth sensors based on stereo imaging devices that capture three-dimensional images), optical sensors such as self-mixing sensors and light detection and ranging (lidar) sensors that gather time-of-flight measurements, humidity sensors, moisture sensors, gaze tracking sensors, electromyography sensors to sense muscle activation, facial sensors, and/or other sensors. In some arrangements, device 10 may use sensors 16 and/or other input-output devices to gather user input. For example, buttons may be used to gather button press input, touch sensors overlapping displays can be used for gathering user touch screen input, touch pads may be used in gathering touch input, microphones may be used for gathering audio input, accelerometers may be used in monitoring when a finger contacts an input surface and may therefore be used to gather finger press input, etc.

If desired, electronic device 10 may include additional components (see, e.g., other devices 18 in input-output devices 24). The additional components may include haptic output devices, actuators for moving movable housing structures, audio output devices such as speakers, light-emitting diodes for status indicators, light sources such as light-emitting diodes that illuminate portions of a housing and/or display structure, other optical output devices, and/or other circuitry for gathering input and/or providing output. Device 10 may also include a battery or other energy storage device, connector ports for supporting wired communication with ancillary equipment and for receiving wired power, and/or other circuitry.

In some embodiments, it may be desirable to input text or other information to device 10. For example, a user of device 10 may wish to input text into a web search bar, a text field, a word processor, or other software. Moreover, to ensure that text may be input discreetly and in the absence of peripheral accessories, a virtual keyboard may be displayed for the user, such as by using displays 14. However, typing traditionally on a virtual keyboard may be difficult, particularly if the virtual keyboard is not projected onto a surface. Therefore, the user's gaze may be used instead of, or in addition to, finger input. An illustrative example of using a user's gaze for gaze swipe text input is shown in FIG. 4.

Figure 4:
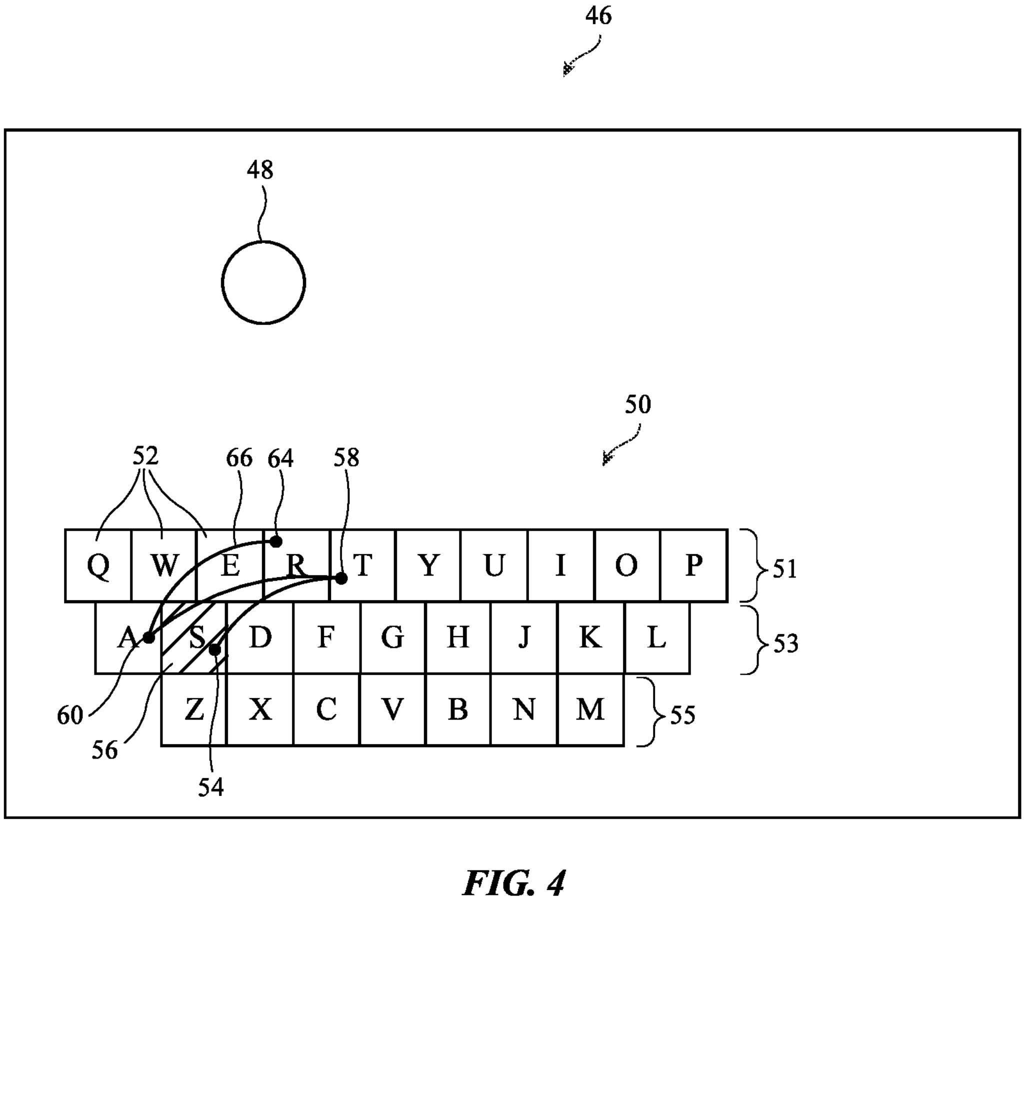
FIG. 4 is a view of an illustrative image of an object and a virtual keyboard displayed by a head-mounted device in accordance with some embodiments.

As shown in FIG. 4, image 46 may be displayed to a user, such as by using displays 14 of FIGS. 1-3. Image 46 may include object 48. Object 48 may be a virtual object or may be an image of a real object at the exterior of device 10 (e.g., an image taken by a camera at the front of device 10).

In addition to containing object 48, image 46 may include virtual keyboard 50. In the illustrative example of FIG. 4, keyboard 50 may be an English keyboard in a traditional QWERTY format. However, this is merely illustrative. In general, keyboard 50 may be a keyboard in any desired language and may have any desired format. Additionally, keyboard 50 may be displayed with any shape and/or size. For example, keyboard 50 may have a curved appearance, may be made smaller or larger, or may have adjusted spacing between the keys of keyboard 50 to improve the user's comfort (e.g., the layout and/or size of keyboard 50 may be adjusted based on the user's IPD or another characteristic).

Virtual keyboard 50 may include virtual keys 52. To input text using virtual keyboard 50, the user's gaze may be used. In particular, a gaze tracker, such as the gaze tracker that includes cameras 42 and light-emitting diodes 44 of FIG. 1, may be used to determine the user's gaze. For example, the gaze tracker may first determine a key 52 at which the user is looking based on the location of the user's gaze. In the example of FIG. 4, the user may first look at the "S" key, as indicated by first gaze location 54. Optionally, the key associated with first gaze location 54 may be highlighted, as indicated by highlighting 56.

Next, the gaze tracker may determine that the user shifts their gaze to the "T" key, as indicated by second gaze location 58, and then the "A" key, as indicated by third gaze location 60, and finally the "R" key, as indicated by fourth gaze location 64. The gaze tracker and/or control circuitry in device 10 (such as control circuitry 20 of FIG. 3) may determine that gaze locations 54, 58, 60, and 64 are connected by curve 66 (also referred to as a gaze swipe input curve herein). In some embodiments, gaze swipe input curve 66 may be displayed for the user (e.g., in image 46). For example, curve 66 may indicate to the user the location of their gaze and their progress in forming the text input. Alternatively, curve 66 may be shown to the user partially, such as by showing only the current portion of curve 66 between individual keys, or by showing a preselected length of curve 66. However, this is merely illustrative. Curve 66 may not be shown to the user, if desired.

Gaze swipe input curve 66 may be formed by fitting a curve to multiple gaze locations (e.g., points of the user's gaze). In particular, the gaze tracker may sample the user's point of gaze at a suitable frequency, such as between one sample every 100 and 1000 ms, one sample less than every 500 ms, one sample less than every 250 ms, or other suitable frequency. In some embodiments, the chosen sampling frequency may reduce the noise in the generated gaze locations and may be faster or approximately as fast as the user's eye movements. Gaze swipe input curve 66 may be determined by using a best fit curve between these gaze locations or otherwise curve fitting the gaze locations.

If desired, gaze swipe input curve 66 may be corrected, such as by assigning different weights to different points of the user's gaze and/or smoothing aberrations in the user's gaze. Curve 66 may then by analyzed, and a corresponding text input may be determined using a machine learning algorithm to optimize the relationship between curve 66 and a word or other text input. In the illustrative example of FIG. 4, it may be determined that the desired text input is "STAR," which may be inserted into a text field or other software that the user is currently using. In other words, the text input may be displayed by displays 14 in image 46. However, the text input shown in FIG. 4 is merely illustrative. In general, the user may input any text, such as words, numbers, symbols, emoji, etc., using the gaze swiping of FIG. 4. In this way, the user's gaze may be used to input text on device 10 as a gaze swipe input.

In some embodiments, in addition to using the user's gaze for text input, a secondary input may be used. For example, the secondary input may alert device 10 that the user is starting a new text input (or a text input string, such as a word) and/or that the user has completed a text input (or a text input string, such as a word). An illustrative example of a secondary input that may be used is shown in FIG. 5.

Figure 5:
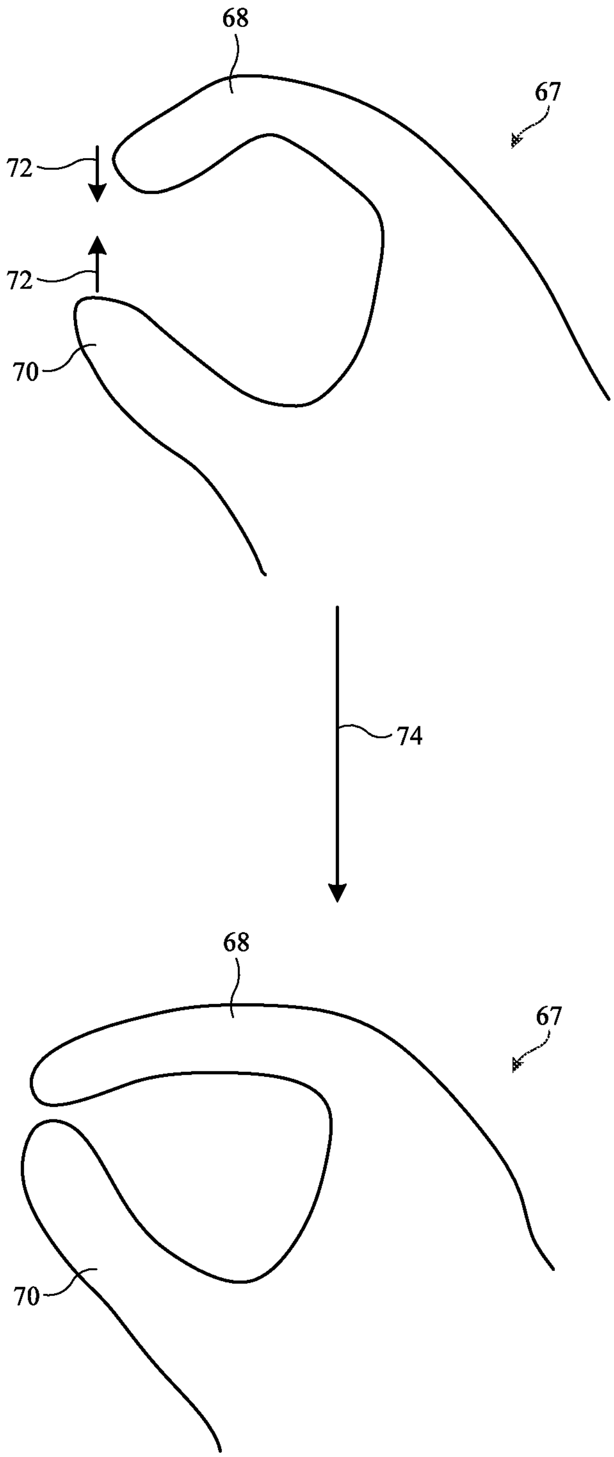
FIGS. 5 and 6 are schematic diagrams of illustrative secondary inputs that may be used to provide text input in accordance with some embodiments.

As shown in FIG. 5, the user's hand 67 may be used for secondary input. In particular, hand 67 may include finger 68 (e.g., an index finger, middle finger, ring finger, or pinky) and thumb 70. The user may provide the secondary input by moving finger 68 and thumb 70 together, as indicated by arrows 72. In other words, the user may pinch finger 68 and thumb 70 together, as indicated by arrow 74, resulting in the pinched configuration shown at the bottom of FIG. 5.

A camera in device 10, such as cameras 33 in FIG. 1, may determine that a user has provided secondary input, such as the pinching motion of FIG. 5. In an illustrative example, in response to the secondary input, it may be determined that the user has started a new text input or a portion of a new text input (e.g., a word). For example, in the embodiment of FIG. 4, the user may pinch finger 68 and thumb 70 together when the user is looking at the "S" key. The key at which the user is looking may be highlighted, as indicated by highlight 56, and/or the dot at location 54 may indicate the key at which the user is looking.

The user may keep finger 68 and thumb 70 pinched together until after the user is done swiping the entire word (or other text input portion) with their gaze (e.g., once the user reaches gaze location 64 in FIG. 4). When the user is done swiping the desired word (or other text input portion), the user may release the pinch (e.g., may move finger 68 away from thumb 70). Based on the released pinch, it may be determined that the user has completed the word (or other text input portion). The associated gaze swiping curve (e.g., curve 66 of FIG. 4) may then be determined by fitting the curve between the user's points of gaze (e.g., gaze locations) that occurred between the pinch and the pinch release. The associated curve may then be analyzed to determine the text input. In this way, the user may use hand 67 as a secondary input in addition to the user's gaze to input text to device 10.

Although FIG. 5 shows using a single finger 68, such as the user's index finger, with thumb 70 as a secondary input, this is merely illustrative. In general, any finger(s) on hand 67 may be used. In some embodiments, different fingers may be used as different inputs. For example, the user may use a different finger to indicate the intended keyboard row at which they are looking. For example, win FIG. 4, keyboard 50 may have rows 51, 53, and 55 of keys 52. Each of the user's fingers may be associated with a given one of rows 51, 53, and 55. As an illustrative example, row 51 may be associated with the user's index finger, row 53 may be associated with the user's middle finger, and row 55 may be associated with the user's ring finger. The user may the pinch thumb 70 with the finger associated with the desired row of text input. In the example of FIG. 4, the user may therefore pinch thumb 70 with their middle finger (or other finger associated with row 53) to provide additional input to device 10 that the user intends to select the letter "S." Alternatively, movement of a user's finger or the user's hand may be substituted for pinching between the user's thumb and finger, if desired.

However, the use of the user's index finger, middle finger, and ring finger for rows 51, 53, and 55, respectively, is merely illustrative. In general, any desired finger may be associated with any desired row. Additionally, keyboard 50 may have additional rows (e.g., a space bar row, a number row, symbol rows), and/or additional layouts (e.g., a layout show symbols, emoji, etc.) that may be associated with one or more of the user's fingers. If desired, the association between the user's finger(s) and keyboard rows may be set up by the user and/or adjusted in the device settings. Alternatively, the association may be adjusted automatically in response to the swipe typing algorithm learning the user's intent.

Additionally, although FIG. 5 shows using a single hand 67 for secondary input, this is merely illustrative. If desired, both of the user's hands may be used for secondary input. As previously discussed, one of the user's hands (e.g., the user's dominant hand) may be used to indicate the start and end of the text input or text input portion. The user's other hand (e.g., the user's non-dominant hand) may be used for other secondary functions. For example, the other hand may be pinched in the same way as shown in FIG. 5 to delete inputted text, pause the gaze swipe tracking, select an autofill text, switch keyboard layouts (e.g., switch between letters, numbers, symbols, emoji, or between layout types such as between QWERTY, an alphabetical layout, Dvorak, Colemak, etc.), switch between keyboard languages, signify the use of an accent mark on a letter, signify the end of a sentence (e.g., a period or full stop), and/or other desired function(s). In some embodiments, different fingers of the user's other hand may each have a different secondary function.

The secondary function(s) provided by the user's dominant and non-dominant hands are merely illustrative. In general, any suitable secondary function(s) may be performed with the user's dominant and/or non-dominant hand.

As an alternative to using hand 67 for secondary input, swipe typing may be performed by moving hand 67 directly. For example, the user may place hand 67 (e.g., finger 68 and thumb 70) over a desired key (the "S" key in FIG. 4), and may pinch finger 68 and thumb 70 together. While keeping finger 68 and thumb 70 pinched together, the user may swipe hand 67 between the desired letters or other components of the text input. In the example of FIG. 4, the user may swipe hand 67 along curve 66 to form a hand swipe input curve. When completed, the user may release finger 68 and thumb 70 to indicate that the user is done with that word or other portion of text input, and the hand swipe input curve may be analyzed to determine the text input. In this way, hand 67 may be used as a primary text input for device 10.

In other embodiments, a mix of gaze and hand swipe typing may be used. For example, an initial letter, number, symbol, or other text may be determined using the user's gaze. Then, the user's hand may be used to swipe between keys of the virtual keyboard to create the hand swipe input curve, which may be analyzed to form the text input.

In general, the pinching motion shown in FIG. 5 is merely illustrative. In general, the user may use any suitable motion to signal to device 10 that a text input is starting/ending. An illustrative example of an alternative secondary input motion is shown in FIG. 6.

Figure 6:
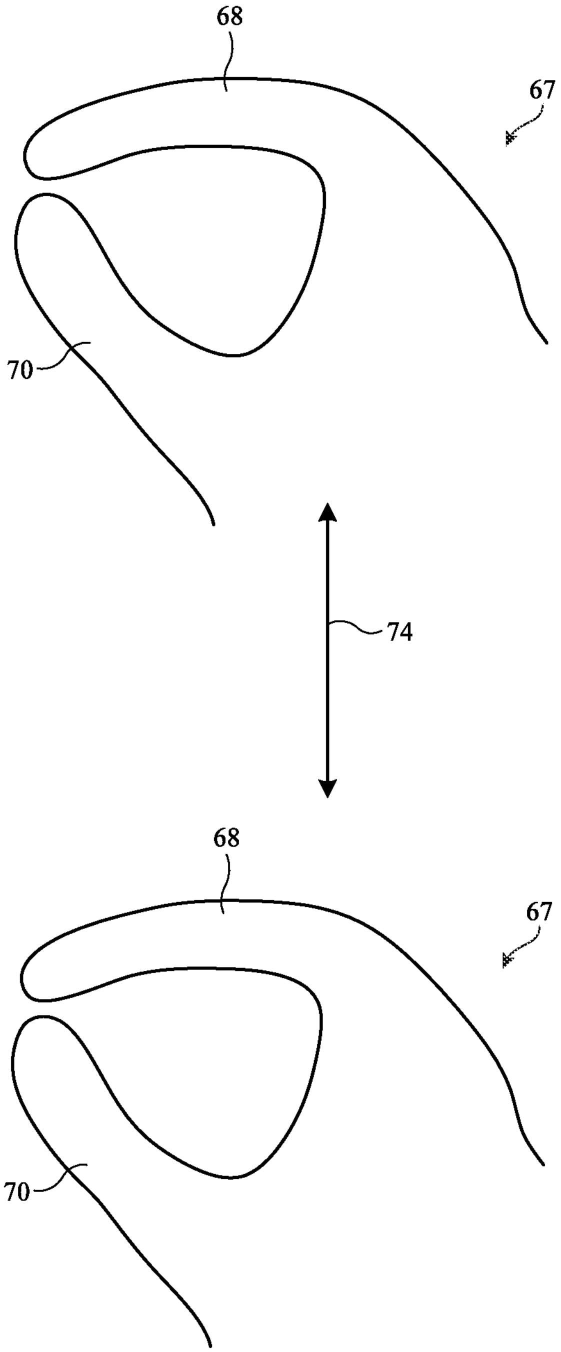

As shown in FIG. 6, the user may move hand 67 up and down along arrow 74 as a secondary input. For example, hand 67 being moved upward may signal the start of a text input, and hand 67 being moved downward may signal the end of the text input. However, the upward and downward motions are merely illustrative. In general, any suitable hand movement may be detected by cameras, such as cameras of sensors 33 (sometimes referred to as cameras 33 herein) of FIG. 1, and the hand movement may be used as a secondary input for gaze swipe typing and/or hand swipe typing.

In the illustrative example of FIG. 6, finger 68 and thumb 70 may be pinched during the motion along arrow 74. However, this is merely illustrative, and the movement of hand 67 may be used as a secondary input regardless of the positions of the fingers and thumb of hand 67.

In some embodiments, it may be desirable to provide autofill recommendations (e.g., recommended words, symbols, numbers, or emoji) as the user is inputting text. An illustrative example of a virtual keyboard with autofill recommendations is shown in FIG. 7.

Figure 7:
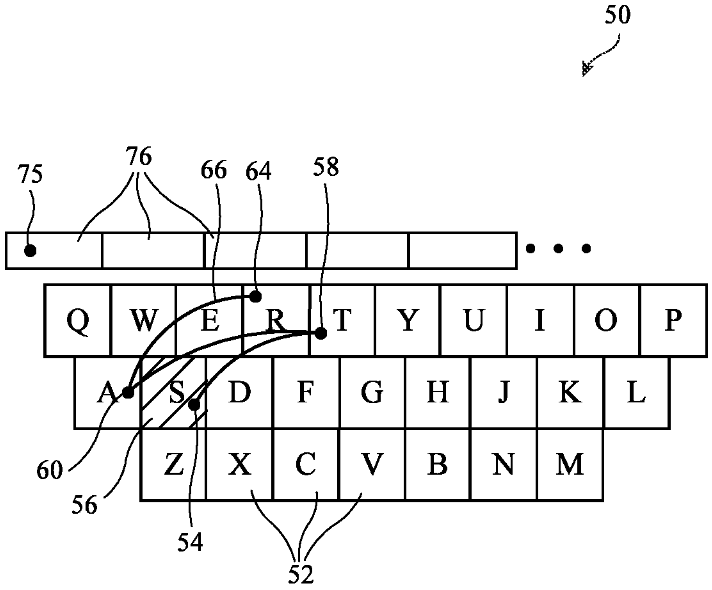
FIGS. 7 and 8 are schematic diagrams of illustrative virtual keyboards with autofill recommendations in accordance with some embodiments.

As shown in FIG. 7, virtual keyboard 50 (which may be part of image 46 of FIG. 4) may include autofill recommendations 76. For example, in the example of FIG. 7, autofill recommendations 76 may be above the uppermost row of keyboard 50. Autofill recommendations 76 may appear while the user is gaze swiping the text input, such as after each selected letter.

For example, after the user selects the letter "S" by gazing at location 54 (along with a secondary input, such as a movement of the user's hand, if desired), autofill recommendations 76 may suggest one or more text inputs that begin with the letter "S." Once the user selects the next letter (e.g., by gazing at location 58), autofill recommendations 76 may be updated. Autofill recommendations 76 may be based on the frequency of text input that include the selected letter(s) or symbol(s), the user's personal typing habits (e.g., by suggesting text input that is used more frequently by the user), frequently mistyped/misspelled text input, or other suitable factor(s).

To select one of autofill recommendations 76, the user may move their gaze to the location of the desired autofill recommendation, such as to gaze location 75. Alternatively or additionally, the user may use a secondary input (e.g., a movement of one of the user's hands) to select an autofill recommendation 76. In an illustrative example, a finger or hand movement of the user's non-dominant hand may be used to allow the user to select a given autofill recommendation. For example, a user may pinch a finger with the thumb of their secondary hand repeatedly to cycle through autofill recommendations, may pinch a finger associated with one of the autofill recommendations (e.g., the middle finger for the second autofill recommendation or the ring finger for the third autofill recommendation) with the thumb of their secondary hand to select the autofill recommendation, or may otherwise use secondary input to select the autofill recommendation. Alternatively, a finger or hand movement of the user's non-dominant hand may pause the gaze tracking curve and allow the user to move their gaze to one of autofill recommendations 76. In other embodiments, a user may use their voice to select an autofill recommendation 76, such as by speaking "One" or "Two" to select the respective autofill recommendation 76. In general, regardless of the selection mechanism, autofill recommendations 76 may allow the user to select a desired text input before finishing the gaze or hand swiping associated with that input (e.g., before finishing curve 66 of FIG. 7).

Although FIG. 7 shows autofill recommendations 76 above a top row of keyboard 50 this is merely illustrative. In general, autofill recommendations 76 may be located anywhere on or near keyboard 50. For example, in the illustrative embodiment of FIG. 8, autofill recommendations 80 may be provided adjacent to the most recently selected key (e.g., the "A" key in the example of FIG. 8). In this way, the user may move their gaze or hand to the autofill recommendations more directly, which may have less of an impact on the gaze or hand swiping curve (e.g., curve 78 of FIG. 8). However, this is merely illustrative. A secondary input, such as a movement of the user's non-dominant hand, may be used to select one of autofill recommendations 80, if desired.

Autofill recommendations 80 may otherwise behave similarly to autofill recommendations 76 of FIG. 7, and may update with each additional selected letter (e.g., may continuously update as the user's gaze or hand position changes and curve 78 is reanalyzed).

In some embodiments, a virtual keyboard may be overlaid onto the user's fingers, which may be used as secondary inputs. An illustrative example is shown in FIG. 9.

Figure 9:
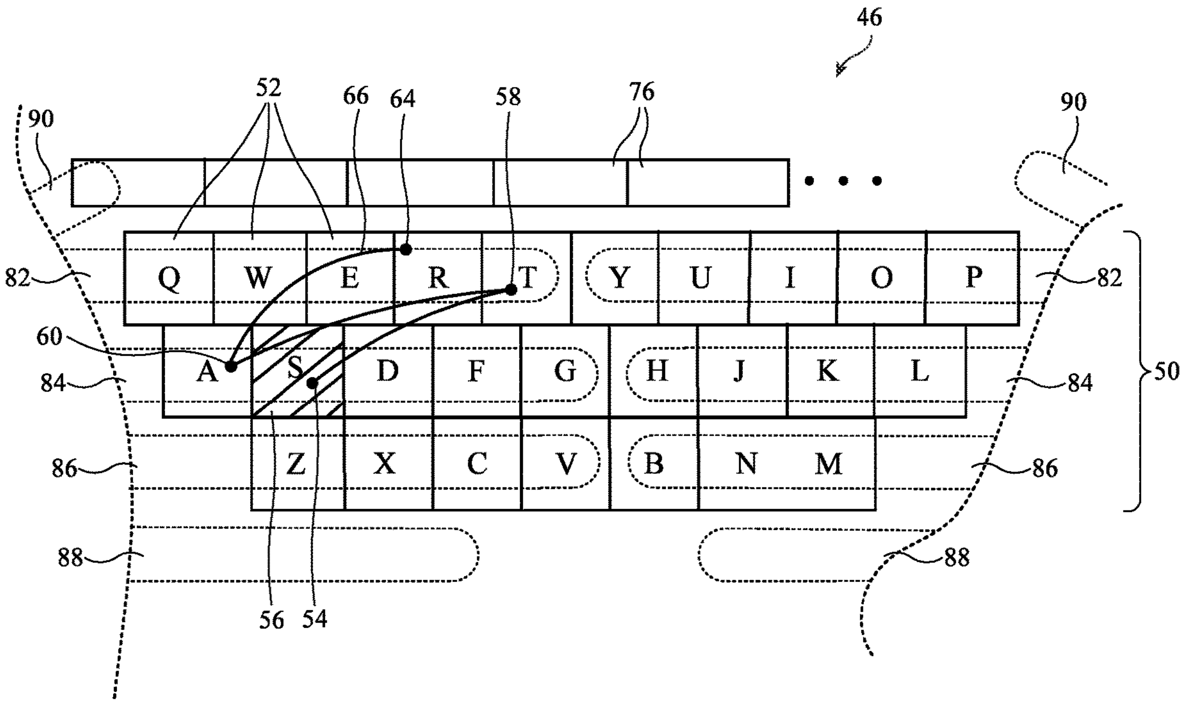
FIG. 9 is a view of an illustrative image of a virtual keyboard overlaid on a user's hands in accordance with some embodiments.

As shown in FIG. 9, displayed image 46 may include keyboard 50 overlaid on fingers 82, 84, 86, and 88 and thumbs 90. In particular, each row of keyboard 50 may correspond to one of fingers 82, 84, 86, or 88 or thumbs 90. When selecting a key of virtual keyboard 50, a user may move the finger associated with the row of the desired key to provide a secondary input to improve the accuracy of the key selection. For example, the user may raise or otherwise move left finger 84 when gazing at location 54 to indicate that the "S" key is desired as the text input. The movement of left finger 84 may also indicate the start of a text input (e.g., instead of the pinch of FIG. 5). The user may move the finger associated with the last key of the text of the text input (e.g., the left finger 82 to indicate the selection of the "R" key) to indicate the end of the text input. Alternatively, the user may move the finger associated with each letter or symbol of the text input, and a different secondary input may be used to signal the beginning and the end of the text input. For example, by moving the finger associated with each letter or symbol of the text input, a double finger movement may indicate the presence of a repeating letter or symbol in the text input. In this way, the user's fingers and/or thumbs may be used to improve the accuracy of gaze swipe typing.

Figure 10:
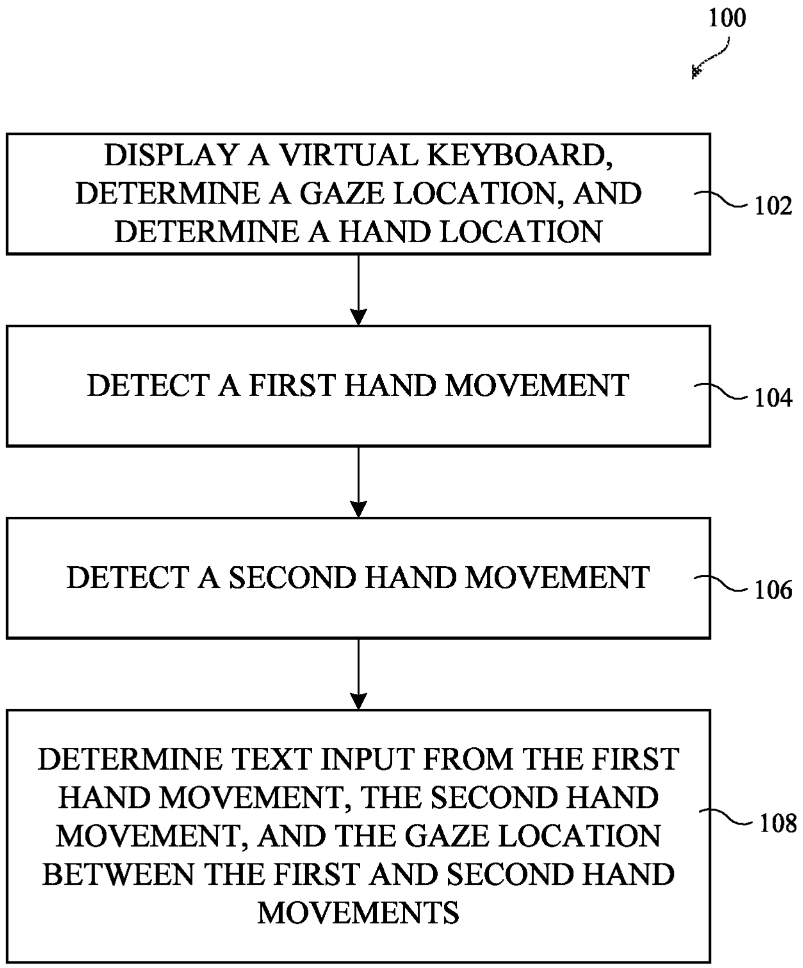
FIG. 10 is a flowchart of illustrative steps that may be used to perform gaze swipe text input in accordance with some embodiments.

Regardless of the secondary input(s) used with gaze swipe typing, an illustrative flowchart 100 of method steps that may be used to input text using a user's gaze is shown in FIG. 10.

As shown in FIG. 10, at step 102, a virtual keyboard may be displayed, a gaze location may be determined, and a hand location may be determined. For example, the virtual keyboard may be displayed using displays 14 of FIG. 1. The virtual keyboard may be overlaid on virtual content, real-life content (e.g., in an augmented or mixed reality mode), pass-through content (e.g., if real-life content is captured by cameras and passed through to the user on a display), or may otherwise be displayed to the user. In general, the keyboard may have any desired layout (e.g., a QWERTY layout, as shown in FIG. 4, a Dvorak layout, an alphabetical layout, etc.) and/or any desired language.

The virtual keyboard may be adjusted based on the content displayed with the virtual keyboard and/or may be adjusted for the user's comfort (e.g., the size of the keyboard, the spacing between keys of the keyboard, or the curvature of the keyboard may be adjusted). In some embodiments, the size of the keyboard may be adjusted based on the user's eyes and/or activity, such as to reduce strain on the user's eyes while inputting text. In general, the virtual keyboard may be adjusted in any suitable manner.

The user's gaze location may be determined, such as by using the gaze tracker of FIG. 1 that includes cameras 42 and light-emitting diodes 44. In particular, the gaze tracker may be used to determine a gaze direction/location of the user's eyes in eye boxes 13. If desired, an indicator may be displayed to indicate a location of the user's gaze. When a user's gaze falls on a key of the virtual keyboard, the key may be highlighted (as shown as highlighting 56 of FIG. 4), if desired.

In particular, the light emitters (such as infrared light emitters) in the gaze tracker may emit light toward the user's eyes, which may create glints on the user's eyes. The cameras in the gaze tracker may determine the locations of these glints at regular intervals based on a desired sampling frequency of the cameras, such as between one sample every 100 and 1000 ms, one sample less than every 500 ms, one sample less than every 250 ms, or other suitable frequency. In some embodiments, the chosen sampling frequency may reduce the noise in the generated gaze locations and may be faster or approximately as fast as the user's eye movements.

The user's hand location may be determined by capturing an image with one or more cameras, such as front-facing cameras 33 of FIG. 1. The images may be gathered and processed, such as by control circuitry in the electronic device. For example, each image frame may be analyzed using image recognition to determine salient portions of the user's hand(s) and/or finger(s), such as the tip and base of the user's finger(s) and/or thumb(s). These salient portions may then be tracked between consecutive frames to determine the location of the user's hand.

At step 104, a first hand movement may be detected at a first time. In particular, the first hand movement may be a secondary input that may indicate that the user is beginning a text input or a portion of a text input (such as a word) at the location of the user's gaze. The secondary input may be a pinch, as shown in FIG. 5, another hand movement, as shown in FIG. 6, or another suitable input. The secondary input may be captured by one or more cameras, such as front-facing cameras 33 of FIG. 1.

The user's hand movement may be determined by capturing an image with one or more cameras, such as front-facing cameras 33 of FIG. 1. The images may be gathered and processed, such as by control circuitry in the electronic device. For example, each image frame may be analyzed using image recognition to determine salient portions of the user's hand(s) and/or finger(s), such as the tip and base of the user's finger(s) and/or thumb(s). These salient portions may then be tracked between consecutive frames to determine the location of the user's hand.

For example, if a pinch provides the secondary input, the position of the user's finger(s) and thumb on a given hand may be tracked to determine whether the finger(s) and thumb are pinched together. An algorithm, such as an image recognition algorithm, may be used for this purpose. If desired, a margin of error may be built into the algorithm, such as to detect a pinch even if there is a small gap, such as a gap of less than 5 mm, less than 10 mm, or less than 15 mm, as examples, between the user's finger and thumb. This margin of error may be adjusted automatically based on the user's behavior, or may be adjusted in the device settings.

The secondary input may begin gaze swipe tracking, which may be in the form of a gaze swipe input curve, such as curve 66 of FIG. 4. In particular, the gaze swipe input curve may be formed by the location of the user's gaze after the secondary input, and may correspond to the letters that the user's gaze passes. This display(s) may display the entirety of, or a portion of, the gaze swipe input curve as the user is inputting the text, or the gaze swipe input curve may not be displayed to the user.

At step 106, a second hand movement may be detected at a second time. In particular, the second hand movement may be a secondary input that may indicate that the user is ending a text input or a portion of a text input (e.g., a text input string, such as a word) at the location of the user's gaze. The secondary input may be a pinch (or the release of a pinch), as shown in FIG. 5, another hand movement, as shown in FIG. 6, or another suitable input. The secondary input may be captured by one or more cameras, such as front-facing cameras 33 of FIG. 1.

Figure 8:
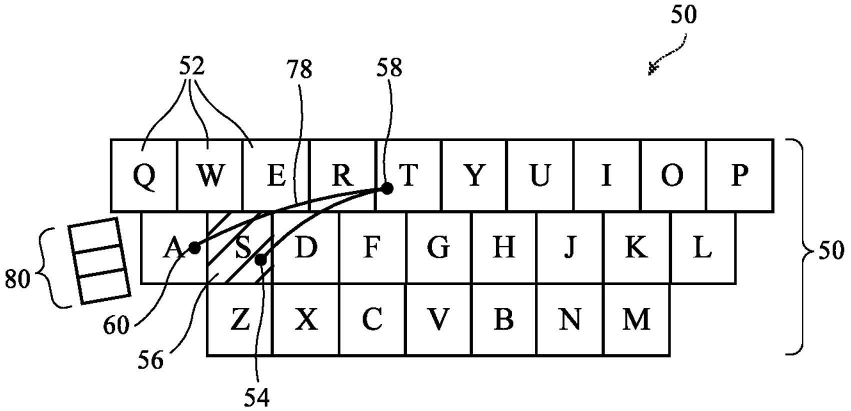

Instead of finishing the text input using gaze tracking, the user may select one or more autofill recommendations, such as autofill recommendations 76 of FIG. 7 or autofill recommendations 80 of FIG. 8. The autofill recommendations may be selected via the user's gaze (e.g., in response to a pause gesture with the user's second hand and a movement of the user's gaze to the desired autofill recommendation), or by a secondary gesture using the user's other hand, such as a pinch with a finger that corresponds to the desired autofill recommendation. In general, the autofill recommendations may update continuously as the gaze tracking curve is formed by the user's gaze.

At step 108, a text input may be determined based on the first hand movement, the second hand movement, and gaze locations between the first and second hand movements (e.g., between the first and second times at which the first and second hand movements occurred). The gaze locations may be used to form gaze swipe input curve 66, for example. In particular, the gaze tracking curve, such as gaze tracking curve 66 of FIG. 4, may be analyzed by a machine learning algorithm to determine the text input. The algorithm may be used to optimize the relationship between the gaze tracking curve and a word or other text input to determine the desired text input. In some embodiments, the algorithm may consider the shape of the curve, the location of the curve relative to keys of the virtual keyboard, the user's text input history, the likelihood of mistyping/misspelling a text input, and/or any other suitable factors. In this way, gaze tracking may be used to input text on a virtual keyboard as gaze swipe input. An illustrative example of analyzing the gaze location between the first and second hand movements is shown in FIG. 11.

Figure 11:
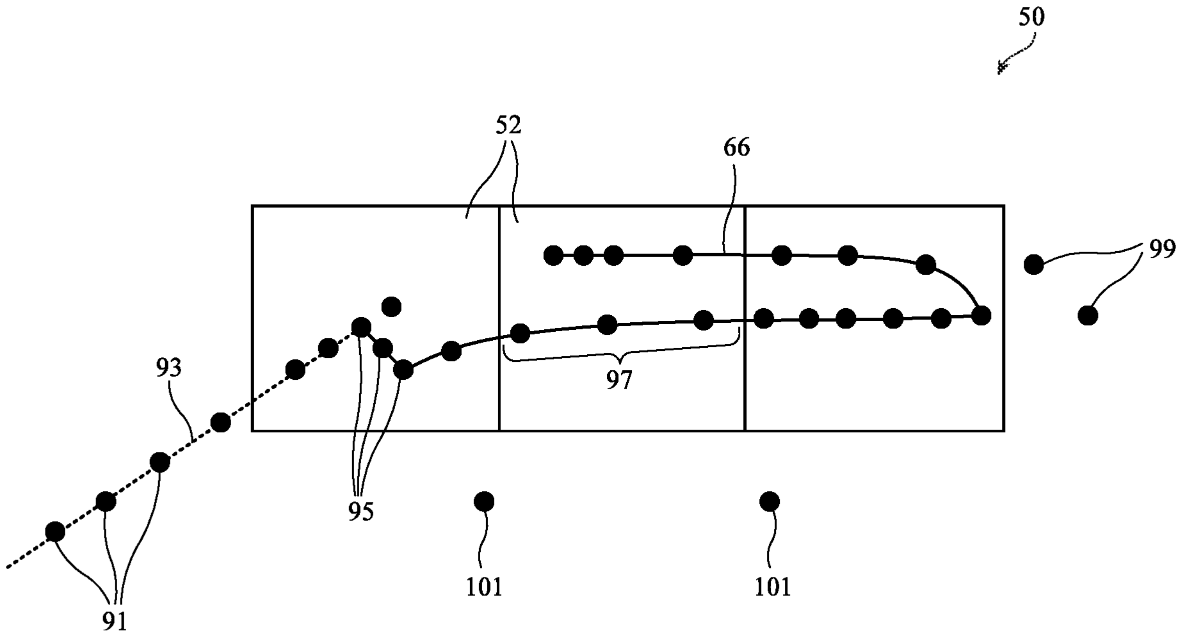
FIG. 11 is a view of an illustrative image of a portion of a virtual keyboard and multiple gaze locations that may be used to form a gaze swipe input curve in accordance with some embodiments.

As shown in FIG. 11, a portion of virtual keyboard 50 may include keys 52. Each of gaze locations 91 (also referred to as points of gaze herein) may be tracked prior to the first hand movement. In the illustrative example of FIG. 11, for example, a user may move their gaze from off of the keyboard onto one of keys 52 along path 93. Alternatively, a user may move their gaze from one key 52 of keyboard 50 to another one of keys 52. Regardless of the user's gaze prior to the first hand input, the gaze may not be used in determining the text input.

Gaze locations 95 may correspond to gaze locations after the first hand input. In particular, gaze locations 95 may be discrete data points that are sampled by a gaze tracker at a desired frequency, such as between one sample every 100 and 1000 ms, one sample less than every 500 ms, one sample less than every 250 ms, or other suitable frequency. In some embodiments, the gaze tracker may track the user's gaze at a frequency that reduces noise. In other words, the frequency may be greater than or approximately equal to the user's eye movement frequency.

The gaze tracker may change frequency at some points, such as to avoid interference with another component in the electronic device, to save battery/power, or otherwise to reduce its frequency. For example, gaze locations 97 may be determined with a reduced frequency than the other gaze locations 95. If desired, additional gaze location(s) may be interpolated based on gaze locations 97, previous text input history, or other factor(s) when a lower frequency is used.

A gaze swipe input curve, such as gaze swipe input curve 66, may be fit to gaze locations 95. For example, gaze swipe input curve 66 may be fit to gaze locations 95 that are measured immediately after the first hand movement. Alternatively, gaze swipe input curve 66 may be fit to the first gaze location 95 after the first hand movement at which the user dwells for longer than a threshold period, such as for more than 100 microseconds, between 100 microseconds and 100 milliseconds, for at least 200 milliseconds, or other suitable amount of time. In general, any suitable algorithm may be used to fit curve 66 to gaze locations 95. For example, curve 66 may be a best fit curve or other curve that fits gaze locations. 95.

Some gaze locations, such as gaze locations 99 and 101, may lie outside of curve 66. In particular, a user's gaze may be prone to jitter, saccades, distractions, or simply looking at the wrong location. These gaze locations may be discarded, or the fitting of curve 66 to the gaze locations may average out the errant gaze locations. For example, a quick eye movement out of curve 66, such as an eye movement of less than 100 microseconds, less than 50 microseconds, or other suitable time, which are illustrative shown as gaze locations 101, may be discarded as jitter, a saccade, or a distraction. Gaze locations 99 may also be discarded due to a short duration (e.g., if the user simply moves past rightmost key 52 and quickly returns to curve 66). Alternatively, gaze locations 99 may be averaged into curve 66. For example, the average of gaze locations 95 and 99 may be averaged to find the centroid of the gaze locations, giving curve 66. In this way, errant gaze locations 99 and 101 may be discarded or otherwise accounted for.

Once gaze swipe input curve 66 is determined (e.g., by fitting a curve to all of the gaze locations taken between a first time associated with a first hand movement and a second time associated with a second hand movement), curve 66 may be analyzed by a machine learning algorithm to determine the text input. The algorithm may be used to optimize the relationship between the gaze tracking curve and a word or other text input (e.g., a text input string) to determine the desired text input. In some embodiments, the algorithm may consider the shape of the curve, the location of the curve relative to keys of the virtual keyboard, the user's text input history, the likelihood of mistyping/misspelling a text input, and/or any other suitable factors. In this way, gaze tracking may be used to input text on a virtual keyboard as gaze swipe input.

Although not shown in FIG. 10, while one hand of the user may provide the first hand movement of step 104 and the second hand movement of step 106, the other hand of the user may provide an additional input. For example, the user's other hand may provide an input to delete a character or word, select an autofill recommendation, pause the gaze swipe tracking, switch the keyboard layout or language, and/or provide any other suitable input function. In some embodiments, different fingers or motions of the other hand may have different input functions.

Although FIGS. 10 and 11 describe gaze tracking for swipe input, this is merely illustrative. If desired, hand tracking may be used instead of, or in addition to gaze tracking. An illustrative flowchart 110 of steps that may be used to input text using hand swiping and/or gaze tracking is shown in FIG. 12.

Figure 12:
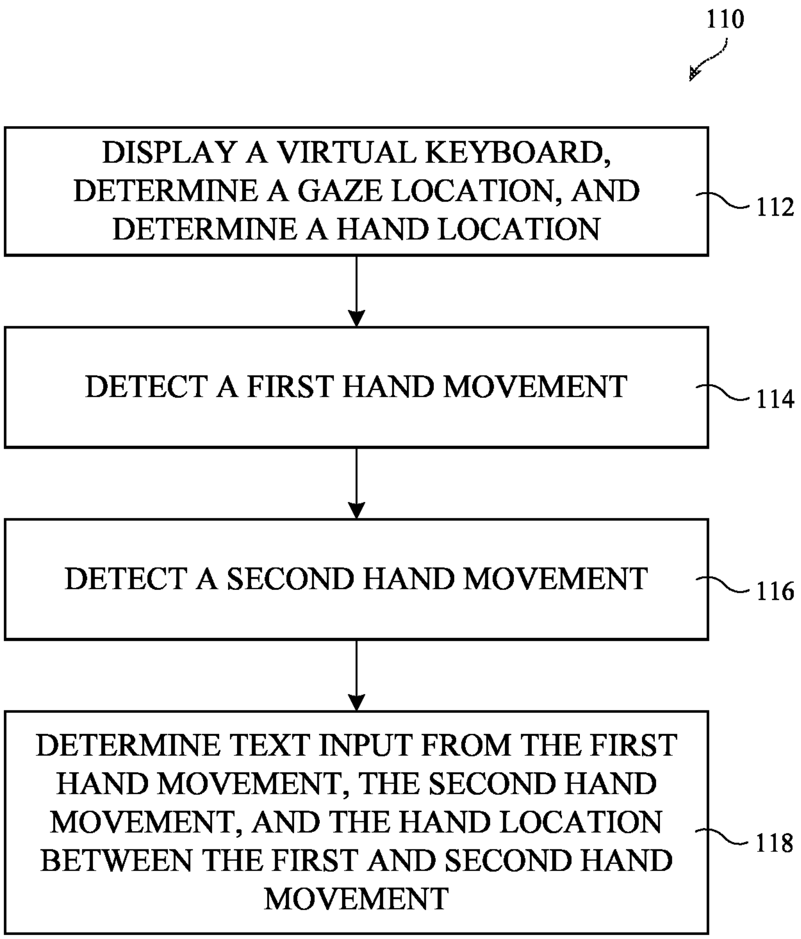
FIG. 12 is a flowchart of illustrative steps that may be used to perform hand swipe text input in accordance with some embodiments.

As shown in FIG. 12, at step 112, a virtual keyboard may be displayed, a gaze location may be determined, and a hand location may be determined. For example, the virtual keyboard may be displayed using displays 14 of FIG. 1. The virtual keyboard may be overlaid on virtual content, real-life content (e.g., in an augmented or mixed reality mode), pass-through content (e.g., if real-life content is captured by cameras and passed through to the user on a display), or may otherwise be displayed to the user. In general, the keyboard may have any desired layout (e.g., a QWERTY layout, as shown in FIG. 4, a Dvorak layout, an alphabetical layout, etc.) and/or any desired language.

The virtual keyboard may be adjusted based on the content displayed with the virtual keyboard and/or may be adjusted for the user's comfort (e.g., the size of the keyboard, the spacing between keys of the keyboard, or the curvature of the keyboard may be adjusted). In some embodiments, the size of the keyboard may be adjusted based on the user's eyes and/or activity, such as to reduce strain on the user's eyes while inputting text. In general, the virtual keyboard may be adjusted in any suitable manner.

The user's gaze location may be determined, such as by using the gaze tracker of FIG. 1 that includes cameras 42 and light-emitting diodes 44, may be used to determine a gaze direction/location of the user's eyes in eye boxes 13. If desired, an indicator may be displayed to indicate a location of the user's gaze. When a user's gaze falls on a key of the virtual keyboard, the key may be highlighted (as shown as highlighting 56 of FIG. 4), if desired.

In particular, the light emitters in the gaze tracker may emit light toward the user's eyes, which may create glints on the user's eyes. The cameras in the gaze tracker may determine the locations of these glints at regular intervals based on a desired sampling frequency of the cameras, such as between one sample every 100 and 1000 ms, one sample less than every 500 ms, one sample less than every 250 ms, or other suitable frequency. In some embodiments, the chosen sampling frequency may reduce the noise in the generated gaze locations and may be faster or approximately as fast as the user's eye movements.

The user's hand location may be determined by capturing an image with one or more cameras, such as front-facing cameras 33 of FIG. 1. The images may be gathered and processed, such as by control circuitry in the electronic device. For example, each image frame may be analyzed using image recognition to determine salient portions of the user's hand(s) and/or finger(s), such as the tip and base of the user's finger(s) and/or thumb(s). These salient portions may then be tracked between consecutive frames to determine the location of the user's hand.

At step 114, a first hand movement may be detected at a first time. In particular, the first hand movement may be a secondary input that may indicate that the user is beginning a text input or a portion of a text input (such as a word) at the location of the user's gaze. The secondary input may be a pinch, as shown in FIG. 5, another hand movement, as shown in FIG. 6, or another suitable input. The secondary input may be captured by one or more cameras, such as front-facing cameras 33 of FIG. 1.

The user's hand movement may be determined by capturing an image with one or more cameras, such as front-facing cameras 33 of FIG. 1. The images may be gathered and processed, such as by control circuitry in the electronic device. For example, each image frame may be analyzed using image recognition to determine salient portions of the user's hand(s) and/or finger(s), such as the tip and base of the user's finger(s) and/or thumb(s). These salient portions may then be tracked between consecutive frames to determine the location of the user's hand.

For example, if a pinch provides the secondary input, the position of the user's finger(s) and thumb on a given hand may be tracked to determine whether the finger(s) and thumb are pinched together. An algorithm, such as an image recognition algorithm, may be used for this purpose. If desired, a margin of error may be built into the algorithm, such as to detect a pinch even if there is a small gap, such as a gap of less than 5 mm, less than 10 mm, or less than 15 mm, as examples, between the user's finger and thumb. This margin of error may be adjusted automatically based on the user's behavior, or may be adjusted in the device settings.

The secondary input may signal the beginning of hand swipe tracking, which may be in the form of a hand swipe input curve, such as curve 66 of FIG. 4. In particular, the hand swipe input curve may be formed by the location of the user's hand after the secondary input, and may correspond to the letters that the user's hand passes. This display(s) may display the entirety of, or a portion of, the hand swipe input curve as the user is inputting the text, or the hand swipe input curve may not be displayed to the user.

At step 116, a second hand movement may be detected at a second time. In particular, the second hand movement may be a secondary input that may indicate that the user is ending a text input or a portion of a text input (e.g., a text input string, such as a word) at the location of the user's hand. The secondary input may be a pinch, as shown in FIG. 5, another hand movement, as shown in FIG. 6, or another suitable input. The secondary input may be captured by one or more cameras, such as front-facing cameras 33 of FIG. 1.

Instead of finishing the text input using hand tracking, the user may select one or more autofill recommendations, such as autofill recommendations 76 of FIG. 7 or autofill recommendations 80 of FIG. 8. The autofill recommendations may be selected via the user's gaze, by a secondary gesture using the user's other hand, such as a pinch with a desired finger, or through hand tracking. In general, the autofill recommendations may update continuously as the hand tracking curve is formed by the user's hand.

At step 118, a text input may be determined based on the first hand movement, the second hand movement, and the hand locations between the first and second hand movements (e.g., the hand swipe input curve determined from the hand locations between the first time at which the first hand movement was determined and the second time at which the second hand movement was determined). In particular, the hand swipe input curve may be analyzed by a machine learning algorithm to determine the text input. In particular, the algorithm may be used to optimize the relationship between the hand tracking curve and a word or other text input to determine the desired text input. In some embodiments, the algorithm may consider the shape of the curve, the location of the curve relative to the keys of the virtual keyboard, the user's text input history, the likelihood of mistyping/misspelling a text input, and/or any other suitable factors. In this way, hand tracking may be used to input text on a virtual keyboard.

Although not shown in FIG. 12, while one hand of the user may provide the first input of step 114 and the second input of step 116, the other hand of the user may provide an additional input. For example, the user's other hand may provide an input to delete a character or word, select an autofill recommendation, pause the gaze swipe tracking, switch the keyboard layout or language, or provide any other suitable input function. Moreover, either or both hands of the user may be used for the hand swipe tracking operations.

Moreover, although FIG. 12 describes tracking the user's hand(s) for swipe text input, this is merely illustrative. If desired, an accessory device, such as a remote, may be held in the user's hand, and may be used for swipe text input.

Although FIGS. 4 and 7-9 showed a QWERTY keyboard layout, this is merely illustrative. In general, a virtual keyboard with any suitable layout may be used for gaze swipe tracking or hand swipe tracking text input. An illustrative example of an alternative keyboard layout that may be used is shown in FIG. 13.

Figure 13:
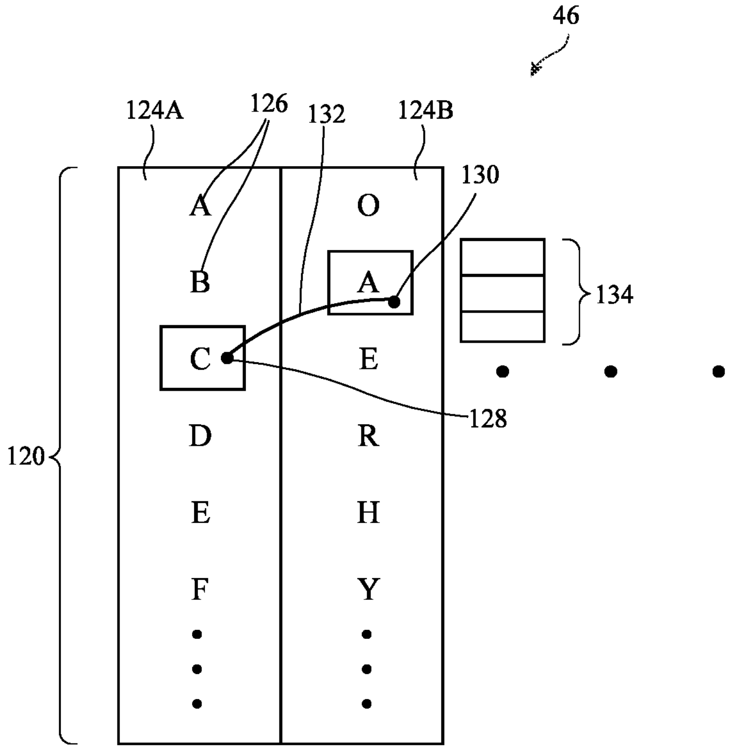
FIG. 13 is a schematic diagram of an illustrative virtual keyboard with an alternative column-based layout in accordance with some embodiments.

As shown in FIG. 13, displayed image 46 may include virtual keyboard 120. Virtual keyboard may be arranged in columns 124. Each column 124 may include keys 126. In the illustrative example of FIG. 13, each key 126 is a letter. However, keys 126 may also include numbers, symbols, emoji, etc.

In FIG. 13, leftmost column 124A displays letters alphabetically. In general, however, column 124A may display letters, numbers, symbols, or emoji in any suitable order, such as the most commonly used characters.

In response to determining first gaze or hand location 128 (e.g., in response to receiving a secondary input when the user's gaze location or hand location is at location 128), it may be determined that the first letter of the text input is "C." Therefore, second column 124B may display letters in a different order. For example, second column 124B may display the letters in decreasing order of probability of following the first letter, either based on the number of possible words with the given letter combination or based on the user's text input habits (e.g., what words or other text that the user usually inputs).

In the illustrative example of FIG. 13, the user's gaze or hand may move to location 130, creating swipe input curve 132. Based on swipe input curve 132, a machine learning algorithm may fit the tracking curve to a likely text input, and autofill recommendations 134 may be generated. A user may then choose one of autofill recommendations 134 (e.g., by moving their gaze or hand location to one of autofill recommendations 134, by selecting one of autofill recommendations 134 with a secondary input, or otherwise selecting the autofill recommendation), or the user may continue selecting additional letters, numbers, emoji, or symbols. Additional columns 124 may continue to be generated with characters in descending order of probability until the user indicates an end of the text input, such as with a hand movement or other secondary input. In this way, keyboard 120 with an alternative column-based layout may be used for gaze or hand tracking input. In general, keyboard 120, or a keyboard of any other desired layout, may be used instead of, or in addition to, keyboard 50 of FIGS. 4 and 7-9

As described above, one aspect of the present technology is the gathering and use of information such as information from input-output devices. The present disclosure contemplates that in some instances, data may be gathered that includes personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of information that may include personal information data to implement one or more various disclosed embodiments, the present disclosure also contemplates that the various embodiments can also be implemented without the need for accessing personal information data. That is, the various embodiments of the present technology are not rendered inoperable due to the lack of all or a portion of such personal information data.

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Computer-generated reality: in contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands). A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects. Examples of CGR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground. Examples of mixed realities include augmented reality and augmented virtuality. Augmented reality: an augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof. Augmented virtuality: an augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Hardware: there are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, μLEDs, liquid crystal on silicon, laser scanning light sources, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

The foregoing is merely illustrative and various modifications can be made to the described embodiments. The foregoing embodiments may be implemented individually or in any combination.

What is claimed is:

1. A head-mounted device, comprising:

a head-mounted support structure;

a camera in the head-mounted support structure, wherein the camera is configured to determine first and second hand movements of a first hand and to detect a secondary input of a second hand, wherein the first hand movement is a finger pinch at a first time and the second hand movement is at a second time that is after the first time;

a gaze tracker in the head-mounted support structure, wherein the gaze tracker is configured to determine a gaze swipe input curve based on gaze locations between the first and second times beginning at the finger pinch;

control circuitry configured to determine a text input based on the gaze swipe input curve; and a display in the head-mounted support structure, wherein the display is configured to display a virtual keyboard and to display the text input in response to the gaze swipe input curve and to the secondary input, wherein the secondary input is configured to delete at least a portion of the text input, to select an autofill recommendation, or to pause the gaze tracker determination of the gaze swipe input curve.

2. The head-mounted device of claim 1, wherein the camera is configured to image a user's hands, and the display is configured to display the virtual keyboard overlaid on the user's hands.

3. The head-mounted device of claim 2, wherein the camera is configured to detect movement of fingers on the user's hands, and the control circuitry is configured to determine the text input based on the gaze swipe input curve and the movement of the fingers.

4. The head-mounted device of claim 3, wherein each of the fingers corresponds to a respective row of the virtual keyboard, and the control circuitry is configured to determine that the text input is from the respective row based on the movement of the respective finger.

5. The head-mounted device of claim 1, wherein the virtual keyboard has keys arranged in columns, and positions of the keys in each column are configured to be arranged as the gaze swipe input curve is generated.

6. A method of determining a text input using a head-mounted device having a display, a gaze tracker, and a camera, the method comprising:

displaying a virtual keyboard with the display;

determining a gaze location on the virtual keyboard with the gaze tracker;

determining first and second hand movements at respective first and second different times with the camera, wherein the first and second hand movements comprise moving a hand upward and downward;

determining a gaze swipe input curve with the gaze tracker based on gaze locations between the first time and the second time; and determining the text input based on the gaze swipe input curve beginning at the upward movement of the hand.

7. The method of claim 6, further comprising:

detecting a secondary input with the camera, wherein determining the text input comprises determining the text input based on the secondary input.

8. The method of claim 7, wherein detecting the secondary input comprises detecting an additional hand movement.

9. A head-mounted device having a front and a rear, comprising:

a support structure;

a first display in the support structure configured to display an image to a first eye box at the rear;

a second display in the support structure configured to display an image to a second eye box at the rear;

a camera at the front, wherein the camera is configured to detect first and second hand movements at respective first and second times, wherein the first and second hand movements comprise movements of a first hand, and wherein the camera is further configured to detect a movement of a second hand;

a gaze tracker in the support structure, wherein the gaze tracker comprises a light emitter and a light detector configured to determine gaze locations; and control circuitry configured to:

display a virtual keyboard using the first and second displays, determine a gaze swipe input based on the gaze locations between the first time and the second time, determine a text input in response to the gaze swipe input, and delete at least a portion of the text input, select an autofill recommendation, or pause the gaze swipe input in response to the movement of the second hand.

10. The head-mounted device of claim 9, wherein the camera is further configured to take an image of a user's hands, and the first and second displays are configured to display the virtual keyboard overlaid on the user's hands.

11. The head-mounted device of claim 10, wherein the camera is further configured to detect movement of fingers on the user's hands, and the control circuitry is configured to determine the text input based on the gaze swipe input and the movement of the fingers.

* * * * *